US012044995B2

(12) United States Patent
Suenami et al.

(10) Patent No.: US 12,044,995 B2
(45) Date of Patent: Jul. 23, 2024

(54) IMAGE FORMING APPARATUS CAPABLE OF DETERMINING FAILURE TIMING OF A GEAR USED THEREIN, AND DETERMINING METHOD OF THE FAILURE TIMING

(71) Applicant: KYOCERA Document Solutions Inc., Osaka (JP)

(72) Inventors: Koji Suenami, Osaka (JP); Norio Kubo, Osaka (JP); Masashi Fujishima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/160,379

(22) Filed: Jan. 27, 2023

(65) Prior Publication Data

US 2023/0259060 A1 Aug. 17, 2023

(30) Foreign Application Priority Data

Jan. 28, 2022 (JP) ................................ 2022-011541

(51) Int. Cl.
*G03G 15/00* (2006.01)

(52) U.S. Cl.
CPC ......... *G03G 15/5041* (2013.01); *G03G 15/55* (2013.01); *G03G 15/757* (2013.01)

(58) Field of Classification Search
USPC .......................................................... 399/49
See application file for complete search history.

(56) References Cited

U.S. PATENT DOCUMENTS

2003/0161663 A1* 8/2003 Yanagida ............ G03G 15/757 399/167
2023/0288863 A1* 9/2023 Fujishima .......... G03G 21/1864

FOREIGN PATENT DOCUMENTS

JP 2011-197243 10/2011

* cited by examiner

*Primary Examiner* — Quana Grainger
(74) *Attorney, Agent, or Firm* — LEX IP MEISTER, PLLC

(57) ABSTRACT

An image forming apparatus includes: a gear that transmits a drive force, which is supplied from a drive unit, to a photosensitive drum; a formation processing unit that, at arrival of each of specific formation timings, uses the photosensitive drum thereby to form a to-be-detected toner image that is based on a to-be-detected image having a specific density; an acquisition processing unit that acquires a variation width of a density in the to-be-detected toner image formed by the formation processing unit; and a determination processing unit that determines a failure timing of the gear based on the variation width for each of the formation timings.

6 Claims, 8 Drawing Sheets

IMAGE FORMING APPARATUS CAPABLE OF DETERMINING FAILURE TIMING OF A GEAR USED THEREIN, AND DETERMINING METHOD OF THE FAILURE TIMING

INCORPORATION BY REFERENCE

This application is based upon, and claims the benefit of priority from, corresponding Japanese Patent Application No. 2022-011541 filed in the Japan Patent Office on Jan. 28, 2022, the entire contents of which are incorporated herein by reference.

BACKGROUND

Field of the Invention

This disclosure relates to an electrophotographic image forming apparatus and a determining method.

Description of Related Art

In an electrophotographic image forming apparatus, a rotary drive force supplied from a drive unit such as a motor drives a rotary member such as a photosensitive drum used for toner image formation. In this type of image forming apparatus, a gear used for supplying the rotary drive force to the rotary member, as the case may be, fails due to an aging deterioration. For this, there is known an image forming apparatus capable of determining a failure timing of the gear based on a drive current supplied to the drive unit.

SUMMARY

An image forming apparatus according to an aspect of this disclosure includes: a gear, a formation processing unit, an acquisition processing unit, and a determination processing unit. The gear transmits a drive force, which is supplied from a drive unit, to a rotary member used for forming a toner image. The formation processing unit, at arrival of each of specific formation timings, uses the rotary member thereby to form a to-be-detected toner image that is based on a to-be-detected image having a specific density. The acquisition processing unit acquires a variation width of a density in the to-be-detected toner image formed by the formation processing unit. The determination processing unit determines a failure timing of the gear based on the variation width for each of the formation timings.

A determining method according to another aspect of this disclosure is executed in an image forming apparatus equipped with a gear that transmits a drive force, which is supplied from a drive unit, to a rotary member used for forming a toner image, and the determining method includes: a forming step, an acquiring step, and a determining step. The forming step, at arrival of each of specific formation timings, uses the rotary member thereby to form a to-be-detected toner image that is based on a to-be-detected image having a specific density. The acquiring step acquires a variation width of a density in the to-be-detected toner image formed by the forming step. The determining step determines a failure timing of the gear based on the variation width for each of the formation timings.

DETAILED DESCRIPTION

The following is a description of an embodiment of this disclosure with reference to the accompanying drawings. The following embodiment is one example exemplifying this disclosure, and does not limit the technical scope of this disclosure.

<Configuration of Image Forming Apparatus 100>

Figure 1:
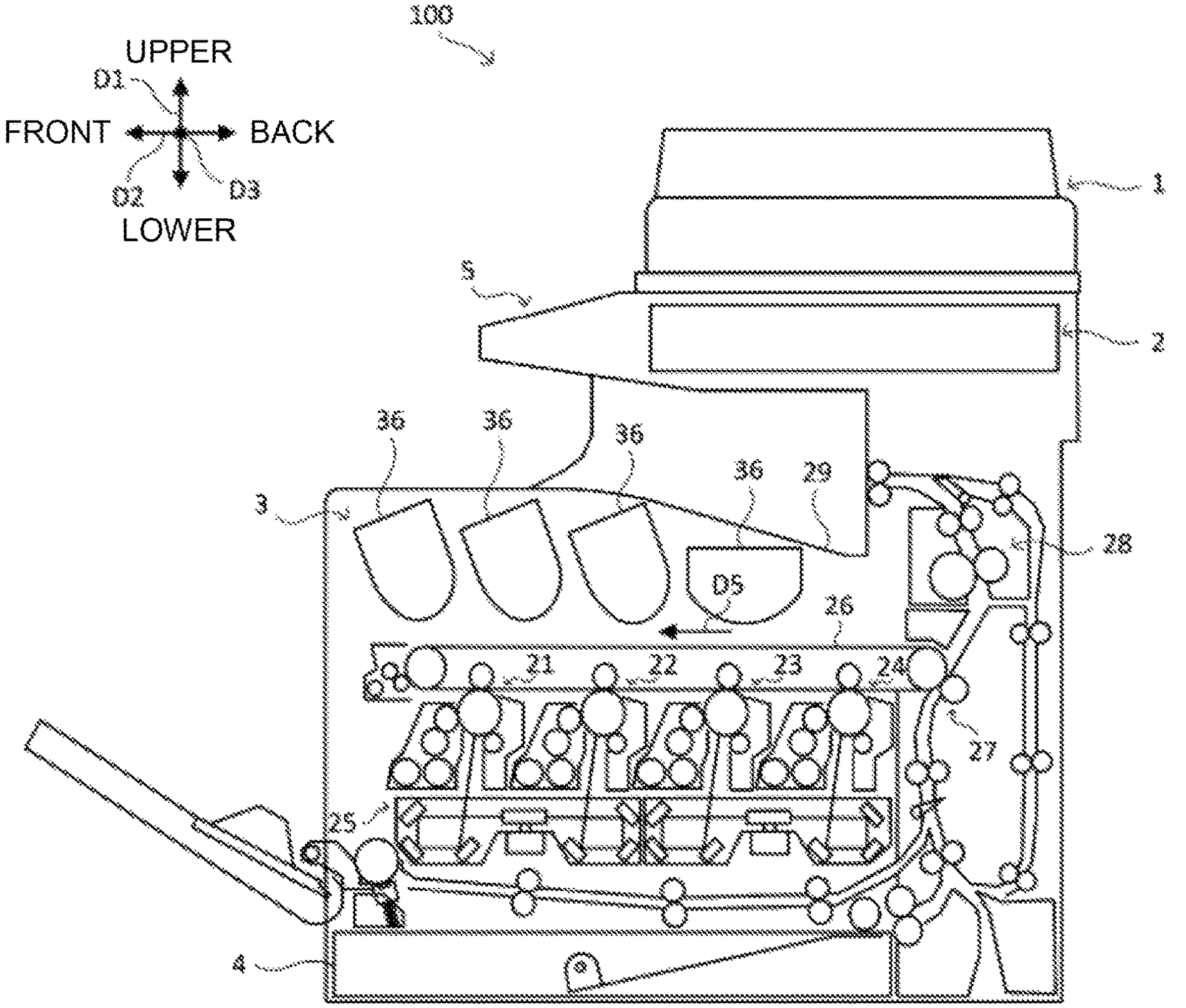
FIG. 1 is a cross-sectional view showing a configuration of an image forming apparatus according to an embodiment of this disclosure.
Figure 2:
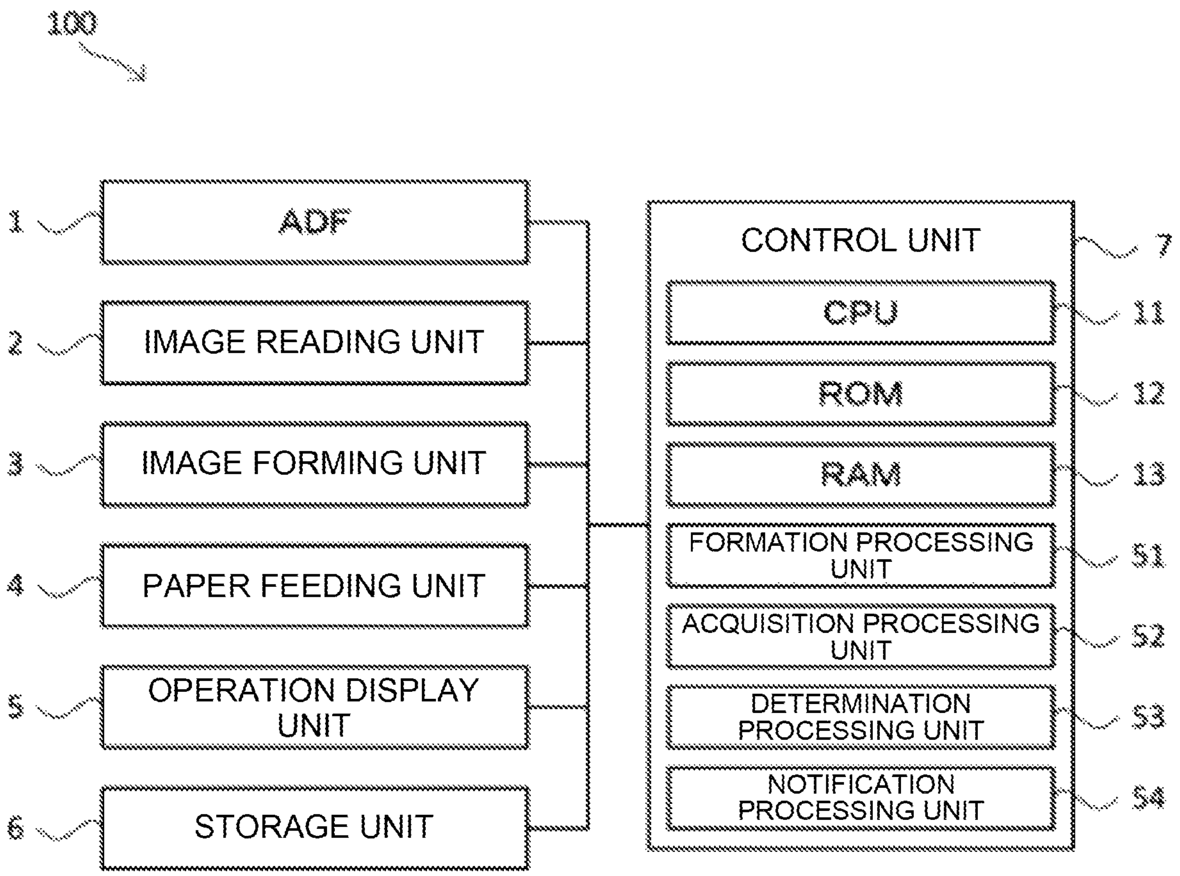
FIG. 2 is a block diagram showing a system configuration of the image forming apparatus according to the embodiment of this disclosure.

First, with reference to FIG. 1 and FIG. 2, a description is made of a configuration of an image forming apparatus 100 according to an embodiment of this disclosure.

For convenience of description, the vertical direction in a setting state (the state shown in FIG. 1) in which the image forming apparatus 100 can be used is defined as an up/down direction D1. And, a front/back direction D2 is defined with the left side of the image forming apparatus 100 shown in FIG. 1 as the front (front face). Also, a right/left direction D3 is defined based on the front of the image forming apparatus 100 in the setting state.

The image forming apparatus 100 is an image processing apparatus having a printing function to form an image based on image data. Specifically, the image forming apparatus 100 is a multifunctional machine having multiple functions including the printing function. Further, the image forming apparatus 100 of this disclosure may be a printer, a fax machine, or a copy machine capable of forming the image by an electrophotographic method.

As shown in FIGS. 1 and 2, the image forming apparatus 100 is equipped with an ADF (Auto Document Feeder) 1, an image reading unit 2, an image forming unit 3, a paper feeding unit 4, an operation display unit 5, a storage unit 6, and a control unit 7.

The ADF 1 conveys a document whose image is to be scanned by the image reading unit 2. The ADF 1 is equipped with a document set unit, a plurality of conveying rollers, a document holder, and a paper discharge unit.

The image reading unit 2 realizes a scanning function to read the image of the document. The image reading unit 2 is equipped with a document stand, a light source, a plurality of mirrors, an optical lens, and a CCD (Charge Coupled Device).

The image forming unit 3 realizes the above printing function. Specifically, the image forming unit 3, according to an electrophotographic method, forms a color image or a monochrome image on a sheet supplied from the paper feeding unit 4.

The paper feeding unit 4 feeds the sheet to the image forming unit 3. The paper feeding unit 4 is equipped with a paper cassette, a manual feed tray, and a plurality of conveying rollers.

The operation display unit 5 is a user interface of the image forming apparatus 100. The operation display unit 5 is equipped with a display unit and an operation unit. The display unit displays various information in response to a control instruction from the control unit 7. For example, the display unit is a liquid crystal display. The operation unit inputs various information to the control unit 7 in response to an operation of a user. For example, the operation unit is a touch screen.

The storage unit 6 is a nonvolatile storage apparatus. For example, the storage unit 6 is a nonvolatile memory such as flash memory.

The control unit 7 comprehensively controls the image forming apparatus 100. As shown in FIG. 2, the control unit 7 includes a CPU 11, a ROM 12, and a RAM 13. The CPU 11 is a processor that executes various arithmetic processes. The ROM 12 is a non-volatile storage apparatus in which information such as a control program for causing the CPU 11 to execute various processes is stored in advance. The RAM 13 is a volatile or non-volatile storage apparatus used as a temporary storage memory (work area) of various processes executed by the CPU 11. The CPU 11 executes various control programs pre-stored in the ROM 12, thereby to comprehensively control the image forming apparatus 100.

Also, the control unit 7 may be a control unit provided separate from a main control unit that comprehensively controls the image forming apparatus 100. And, the control unit 7 may be composed of an electronic circuit such as an integrated circuit (ASIC).

<Configuration of Image Forming Unit 3>

Figure 3:
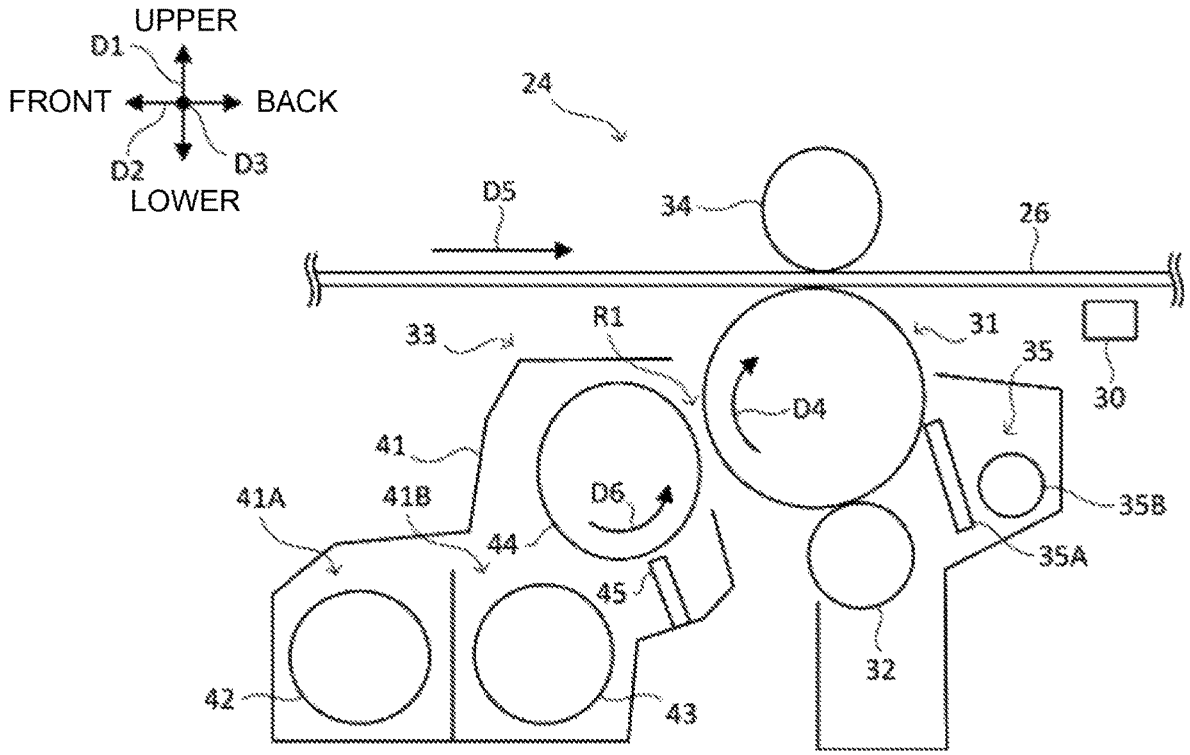
FIG. 3 is a cross-sectional view showing a configuration of an image forming unit of the image forming apparatus according to the embodiment of this disclosure.
Figure 4:
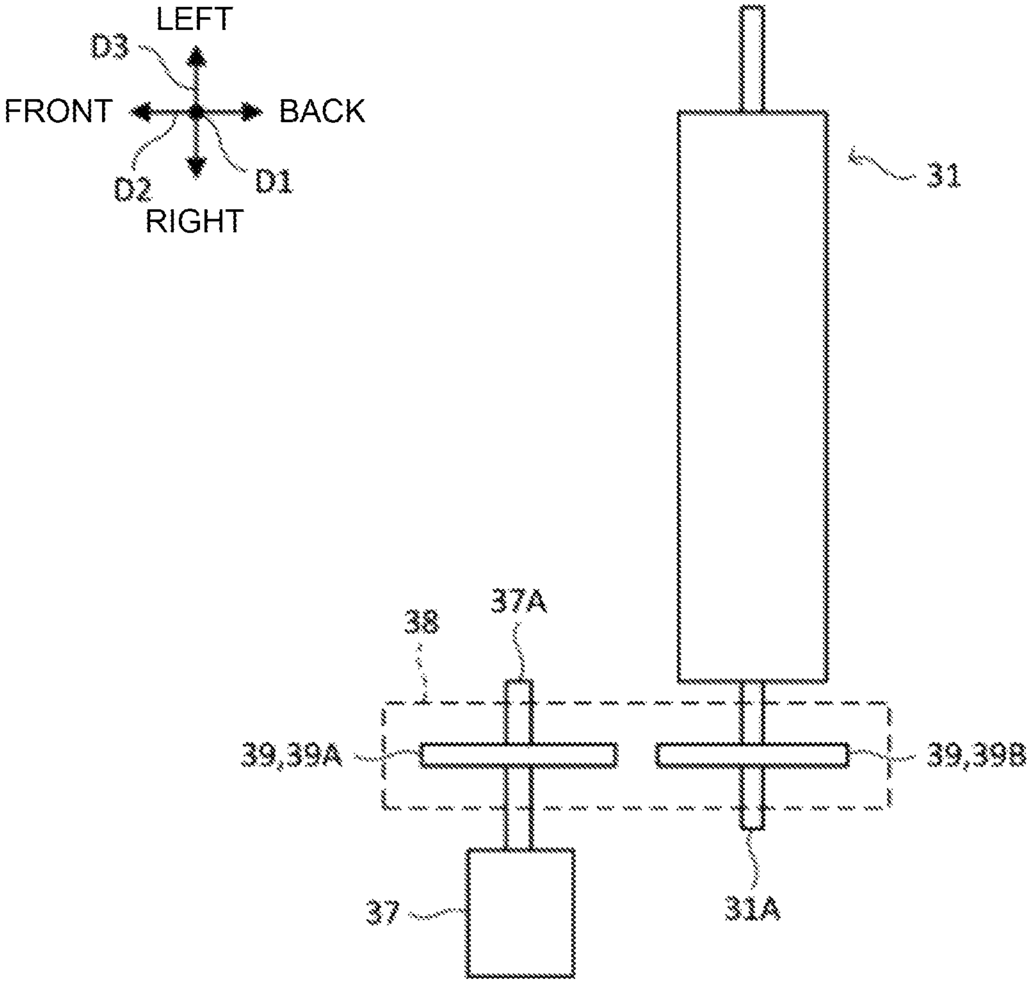
FIG. 4 shows a configuration of a drive unit and drive force transmission unit of the image forming apparatus according to the embodiment of this disclosure.

Next, with reference to FIGS. 1, 3, and 4, a configuration of the image forming unit 3 is to be described. Here, FIG. 3 is a cross-sectional view showing a configuration of an image forming unit 24. And, FIG. 4 is a diagram viewing, from the top, a photosensitive drum 31, a drive unit 37, and a drive force transmission unit 38.

As shown in FIG. 1, the image forming unit 3 is equipped with a plurality of image forming units 21 to 24, an optical scanning apparatus 25, a middle transfer belt 26, a secondary transfer roller 27, a fixing apparatus 28, and a paper discharge tray 29. Also, the image forming unit 3 has a plurality of density sensors 30 (see FIG. 3).

The image forming unit 21 forms a Y (yellow) toner image. The image forming apparatus 22 forms a C (cyan) toner image. The image forming apparatus 23 forms an M (magenta) toner image. The image forming unit 24 forms a K (black) toner image. As shown in FIG. 1, the image forming units 21 to 24 are provided in the order of yellow, cyan, magenta, and black from the front side of the image forming apparatus 100 along the front/back direction D2 of the image forming apparatus 100.

As shown in FIG. 3, the image forming unit 24 is equipped with a photosensitive drum 31, a charging roller 32, a developing apparatus 33, a primary transfer roller 34, and a drum cleaning unit 35. Also, the image forming unit 24 has the toner container 36 (see FIG. 1), the drive unit 37 (see FIG. 4), and the drive force transmission unit 38 (see FIG. 4). Further, each of the image forming units 21 to 23 is the same in configuration as the image forming unit 24.

The photosensitive drum 31 has a surface formed by a static latent image. For example, the photosensitive drum 31 has a photosensitive layer formed by an organic photosensitive material. The photosensitive drum 31 is rotatably supported by the image forming apparatus 100's housing that houses the image forming unit 3 and the paper feeding unit 4. Receiving a rotary drive force supplied from the drive unit 37, the photosensitive drum 31 rotates in a rotary direction D4 shown in FIG. 3. Thereby, the photosensitive drum 31 carries an electrostatic latent image formed on the surface. Further, the photosensitive layer may be formed by any other photosensitive material such as amorphous silicon.

The photosensitive drum 31 is used for forming a toner image. The photosensitive drum 31 is an example of an image carrier of this disclosure, and an example of the rotary member of this disclosure.

The charging roller 32 receives a preset charging voltage, and charges the surface of the photosensitive drum 31. For example, the charging roller 32 positively charges the surface of the photosensitive drum 31. As shown in FIG. 3, the charging roller 32 is provided in contact with the photosensitive drum 31. The charging roller 32 is driven to rotate as the photosensitive drum 31 rotates. The photosensitive drum 31's surface charged by the charging roller 32 is irradiated with light that is based on the image data emitted from the optical scanning apparatus 25. This forms the electrostatic latent image on the surface of the photosensitive drum 31.

The developing apparatus 33 uses a developing agent including a toner and a carrier, thereby to develop the electrostatic latent image to be formed on the surface of the photosensitive drum 31.

As shown in FIG. 3, the developing apparatus 33 has a housing 41, a first conveying member 42, a second conveying member 43, a developing roller 44, and a regulating member 45.

The housing 41 houses the first conveying member 42, the second conveying member 43, the developing roller 44, and the regulating member 45. Also, the housing 41 has a circulatory conveying path through which the developing agent circulates. The circulatory conveying path includes a first conveying path 41A (see FIG. 3) and a second conveying path 41B (see FIG. 3) which extend in the right/left direction D3.

In one of the right/left directions D3, the first conveying member 42 conveys the developing agent housed in the first conveying path 41A. And, the first conveying member 42 stirs the developing agent, thereby to rub-charge the toner and the carrier. For example, the toner is positively charged by the rub-charging with the carrier. For example, the first conveying member 42 is a screw-shaped member so provided as to be rotatable around a rotary axis along the right/left direction D3 in the first conveying path 41A.

In the opposite direction of the direction of conveying the developing agent by the first conveying member 42, the second conveying member 43 conveys the developing agent housed in the second conveying path 41B. Further, the second conveying member 43 stirs the developing agent thereby to rub-charge the toner and the carrier. For example, the second conveying member 43 is a screw-shaped member so provided as to be rotatable around a rotary axis along the right/left direction D3 in the second conveying path 41B.

The developing roller 44 is so provided as to face the photosensitive drum 31, and supplies the developing agent to a facing region R1 (see FIG. 3) facing the photosensitive drum 31.

As shown in FIG. 3, the developing roller 44 is so provided as to face the second conveying member 43. The developing roller 44 pumps the developing agent from the second conveying path 41B. The developing agent pumped by the developing roller 44, by a magnetic force of a magnetic pole provided inside the developing roller 44, forms a magnetic brush on an outer peripheral face of the developing roller 44. The developing roller 44 is rotatably supported by the housing 41, and, receiving a rotary drive force supplied from an un-shown motor, rotates in a rotary direction D6 shown in FIG. 3. With this, to the facing region R1 (see FIG. 3), the developing roller 44 conveys the magnetic brush formed on the outer circumferential face thereof. A specific developing bias voltage is applied to the developing roller 44. With this, the toner included in the magnetic brush conveyed to the facing region R1 is supplied to the electrostatic latent image, thereby to develop (visualize) the electrostatic latent image.

The regulating member 45 regulates a layer thickness of the magnetic brush formed on the outer circumferential face of the developing roller 44. As shown in FIG. 3, the regulating member 45 is provided downstream in the rotary direction D6 from a facing region between the second conveying member 43 and the developing roller 44, and upstream in the rotary direction D6 from the facing region R1. The regulating member 45 is so provided as to face the outer circumferential face of the developing roller 44 in a manner to form a specific gap relative to the outer circumferential face of the developing roller 44.

Further, the developing apparatus 33 may be equipped with a magnet roller that pumps the developing agent from the second conveying path 41B, and that supplies, to the developing roller 44, the toner included in the pumped developing agent. In this case, the developing roller 44 needs only to supply the toner to the facing region R1. The developing agent may be a one-component developing agent that does not include the carrier.

Receiving an application of a preset primary transfer voltage, the primary transfer roller 34 transfers, to the middle transfer belt 26, the toner image to be formed, by the developing apparatus 33, on the surface of the photosensitive drum 31. As shown in FIG. 3, the primary transfer roller 34 is provided in contact with an inner circumference face of the middle transfer belt 26. Further, the primary transfer roller 34 is so provided as to face the photosensitive drum 31 across the middle transfer belt 26. The primary transfer roller 34 is driven to rotate as the middle transfer belt 26 rotates.

The drum cleaning unit 35 cleans the surface of the photosensitive drum 31. As shown in FIG. 3, the drum cleaning unit 35 has a cleaning member 35A and a conveying member 35B. The cleaning member 35A removes an adhering matter to the surface of the photosensitive drum 31. Specifically, the cleaning member 35A is a blade-shaped member provided in contact with the surface of the photosensitive drum 31. To a container (not shown), the conveying member 35B conveys the adhering matter removed, by the cleaning member 35A, from the surface of the photosensitive drum 31.

The toner container 36 contains the toner. To the developing apparatus 33, the toner container 36 supplies the toner contained inside.

The drive unit 37 generates the drive force for rotating the photosensitive drum 31. Specifically, the drive unit 37 is a motor that generates the rotary drive force.

To the photosensitive drum 31, the drive force transmission unit 38 transmits the drive force generated by the drive unit 37. Receiving the rotary drive force supplied from the drive unit 37 via the drive force transmission unit 38, the photosensitive drum 31 rotates.

As shown in FIG. 4, the drive force transmission unit 38 has a plurality of the gears 39 including a first gear 39A and a second gear 39B. The first gear 39A is fixed to a drive shaft 37A (see FIG. 4) of the drive unit 37, and rotates integrally with the drive shaft 37A. The second gear 39B is fixed to one end portion of a rotary axis 31A (see FIG. 4) of the photosensitive drum 31 in an extension direction (right/left direction D3) of the rotary axis 31A, and rotates integrally with the rotary axis 31A. Specifically, the second gear 39B is fixed to the right end portion in the rotary axis 31A. Between the first gear 39A and the second gear 39B, there is provided one or more gears 39 (not shown) used for transmitting the rotary drive force from the first gear 39A to the second gear 39B. The gear 39 included in the drive force transmission unit 38 transmits, to the photosensitive drum 31, the drive force supplied from the drive unit 37.

Further, the first gear 39A may be meshed with the second gear 39B. And, to both the photosensitive drum 31 and the developing roller 44 (another example of a rotary member of this invention), the drive force transmission unit 38 may transmit the drive force generated by the drive unit 37.

Toward the surface of the photosensitive drum 31 of each of the image forming units 21 to 24, the optical scanning apparatus 25 emits the light that is based on image data.

The middle transfer belt 26 is an endless belt member to which the toner image formed on the surface of the photosensitive drum 31 of each of the image forming units 21 to 24 is transferred. At a specific tension, the middle transfer belt 26 is tensioned by a drive roller, a tension roller, and the four primary transfer rollers 34. As the drive roller rotates by receiving the rotary drive force supplied from a motor (not shown), the middle transfer belt 26 rotates in a rotary direction D5 shown in FIGS. 1 and 3. As a result, to a position for transferring, by the secondary transfer roller 27, to the sheet, the middle transfer belt 26 transfers the toner image transferred from each of the photosensitive drums 31.

Receiving an application of a preset secondary transfer voltage, the secondary transfer roller 27 transfers the toner image, which is transferred to the surface of the middle transfer belt 26, to the sheet supplied from the paper feeding unit 4. As shown in FIG. 1, the secondary transfer roller 27 is provided in contact with the outer circumferential face of the middle transfer belt 26. The secondary transfer roller 27 is rotatably supported by the housing of the image forming apparatus 100. The secondary transfer roller 27 is driven to rotate as the middle transfer belt 26 rotates. By the housing of the image forming apparatus 100, the secondary transfer roller 27 is so provided as to be movable between a contact position for contact with the middle transfer belt 26 and a spaced-apart position to be spaced apart from the middle transfer belt 27. Receiving a drive force supplied from a movement mechanism (not shown), the secondary transfer roller 27 moves between the contact position and the spaced-apart position.

To the sheet, the fixing apparatus 28 fixes the toner image transferred to the sheet by the secondary transfer roller 27.

To the paper discharge tray 29, the sheet to which the toner image is fixed by the fixing apparatus 28 is discharged.

The plurality of density sensors 30 detects a density of the toner image transferred to the outer circumferential face of the middle transfer belt 26. As shown in FIG. 3, the plurality of density sensors 30 is placed downstream of the middle transfer belt 26 in the rotary direction D5 from the image forming unit 24 and upstream of the secondary transfer roller 27 in the rotary direction D5. Also, the plural density sensors 30 are so provided as to be arranged along the right/left direction D3 which is a width direction of the middle transfer belt 26.

Each of the density sensors 30 is a so-called reflective type optical sensor, and is equipped with a light emitting unit that emits light toward the outer circumferential face of the middle transfer belt 26 and a light receiving unit that receives the light emitted from the light emitting unit and reflected by the outer circumferential face of the middle transfer belt 26. To the control unit 7, each of the density sensors 30 inputs an electrical signal that accords to a received light amount in the light receiving unit.

By the way, in the image forming apparatus 100, the gear 39 included in the drive force transmission unit 38, as the case may be, fails due to aging deterioration. For this, there is known an image forming apparatus that can determine a failure timing of the gear 39 based on the drive current supplied to the drive unit 37.

Here, at a timing when a load increase due to the aging deterioration of the gear 39 is reflected to the drive current, the aging deterioration of the gear 39, as the case may be, is considerably progressing. Thus, in the configuration to determine the failure timing based on the drive current, maintenance preparation, as the case may be, is not in time for the determined failure timing.

Contrary to the above, the image forming apparatus 100 according to the embodiment of this disclosure can early determine the failure timing of the gear 39, as described below.

Configuration of Control Unit 7

Figure 5:
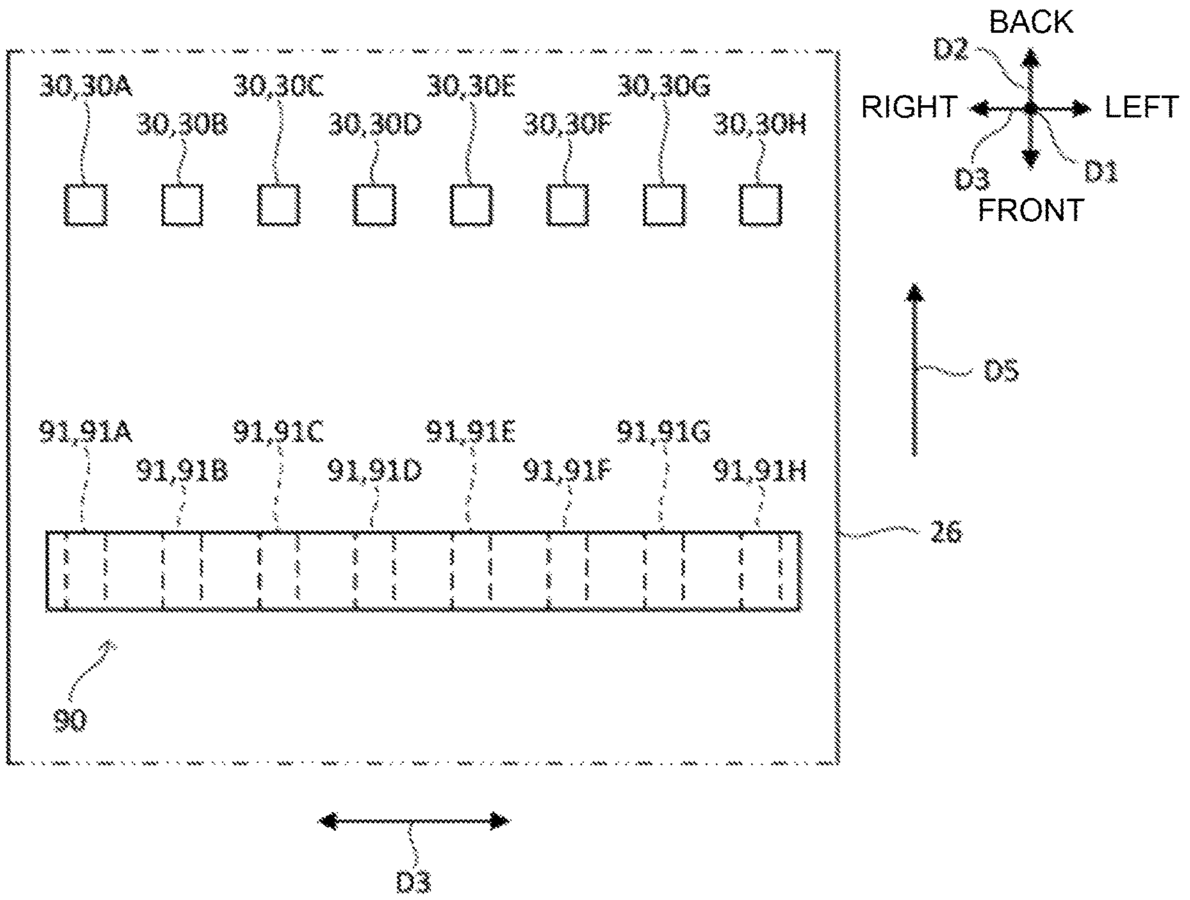
FIG. 5 shows a to-be-detected toner image formed by the image forming apparatus according to the embodiment of this disclosure.
Figure 6:
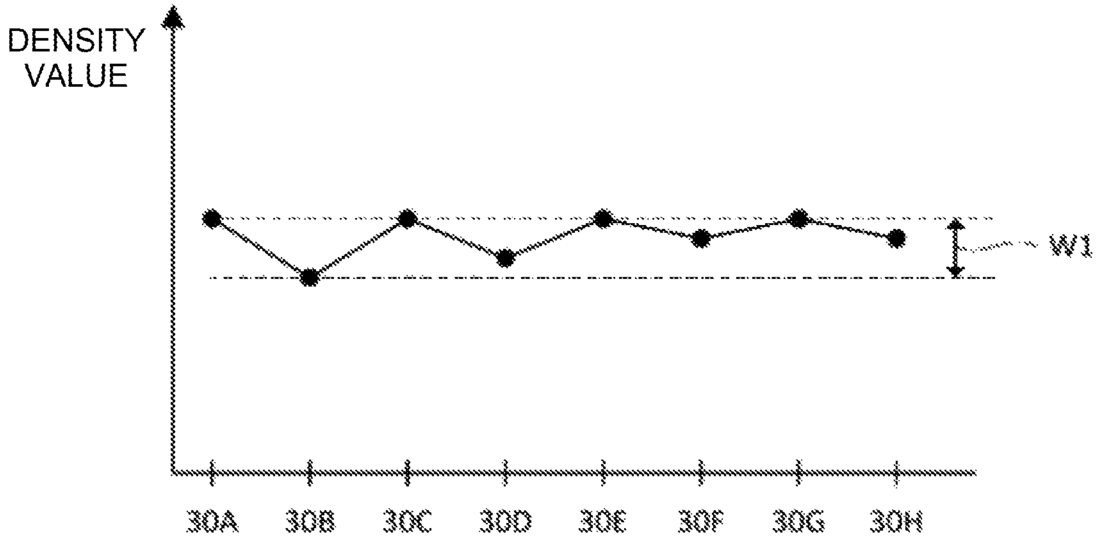
FIG. 6 shows an example of a detection result of a density of the to-be-detected toner image formed by the image forming apparatus according to the embodiment of this disclosure.
Figure 7:
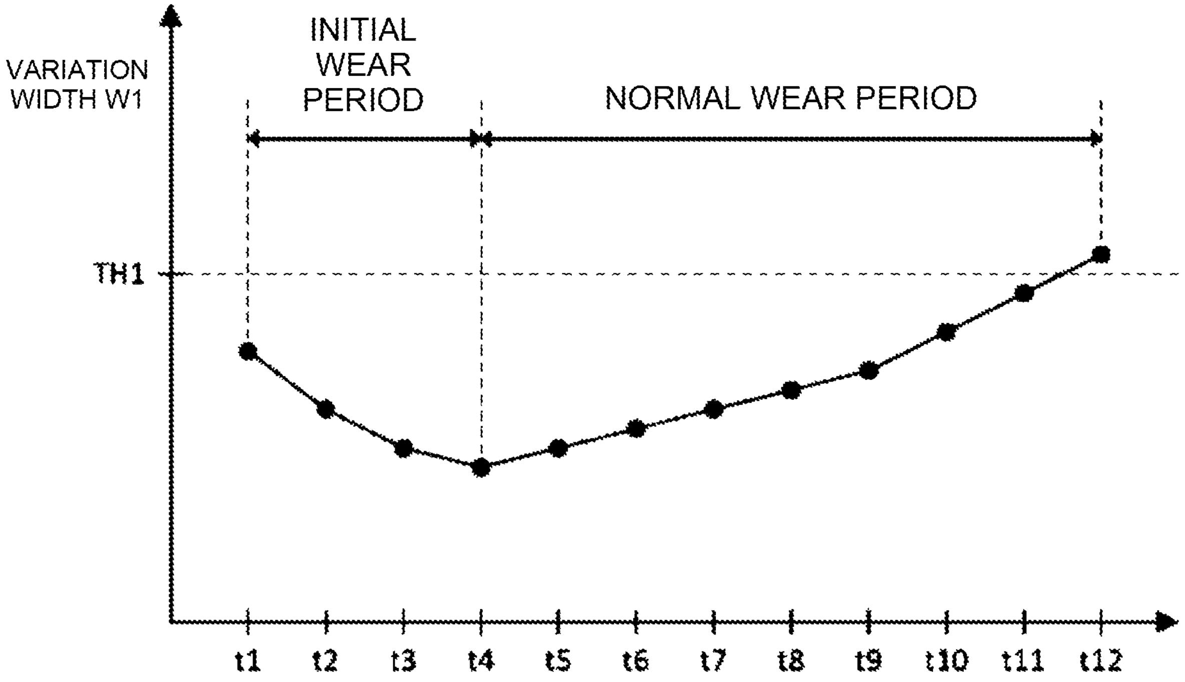
FIG. 7 shows an example of a transition of density's variation width which is acquired by the image forming apparatus according to the embodiment of this disclosure and which is of the to-be-detected toner image.

Next, the configuration of the control unit 7 is to be described with reference to FIG. 2 and FIGS. 4 to 7. Here, FIG. 5 is a view, from the lower side, of the outer circumferential face of the middle transfer belt 26, showing the to-be-detected toner image 90 and plural density sensors 30 formed on the outer circumferential face. Also FIG. 6 shows an example of a detection result of the to-be-detected toner image 90's density detected by the plural density sensors 30 (30A, 30B, 30C, 30D, 30E, 30F, 30G, 30H). Also, FIG. 7 shows an example of a transition of a variation width W1 acquired by an acquisition processing unit 52.

As shown in FIG. 2, the control unit 7 includes a formation processing unit 51, the acquisition processing unit 52, a determination processing unit 53, and a notification processing unit 54.

Specifically, the ROM 12 of the control unit 7 preliminarily stores a failure timing determination program for causing the CPU 11 to function as each unit above, and the CPU 11 executes the failure timing determination program stored in the ROM 12, thereby to function as each unit above.

Further, the above fault timing determination program is recorded in a computer-readable recording medium such as CD, DVD, and flash memory, and may be read from the recording medium to be stored in a storage apparatus such as the storage unit 6. Also, part or all of the formation processing unit 51, the acquisition processing unit 52, the determination processing unit 53, and the notification processing unit 54 may be composed of an electronic circuit such as an integrated circuit (ASIC).

In the following description, among the image forming units 21 to 24, each unit included in the image forming unit 24 and each unit provided corresponding to the image forming unit 24 will be described as an example. The same applies to each of the image forming units 21 to 23.

Each time the specific formation timing arrives, the formation processing unit 51 uses the photosensitive drum 31, thereby to form the to-be-detected toner image 90 (see FIG. 5) that has a specific density and that is based on the to-be-detected image.

Specifically, the formation timing is a timing when the cumulative total of the number of printed sheets output by the image forming apparatus 100 (the number of printed sheets) reaches a multiple of a specific standard number of sheets. Further, the formation timing may be a timing when the cumulative value of the drive time of the drive unit 37 reaches a multiple of a specific standard time.

Further, the to-be-detected image is an image expressed only by the density value of black which is among a plurality of print colors (yellow, cyan, magenta, and black) and which is the print color corresponding to the image forming unit 24. The to-be-detected image is an image having the black density value of 25 percent or more and less than 75 percent. That is, the to-be-detected image is a halftone image. Further, the to-be-detected image can be an image with the black density value of 100 percent, that is, a black image.

As shown in FIG. 5, the to-be-detected toner image 90 is a long toner image along the right/left direction D3 which is the extension direction of the rotary axis 31A of the photosensitive drum 31. That is, the to-be-detected image is a long image in the direction corresponding to the right/left direction D3.

For example, in the image forming apparatus 100, to-be-detected image data including the to-be-detected image are preliminarily stored in the ROM 12 of the control unit 7.

For example, the formation processing unit 51, when the formation timing arrives during execution of the image forming process to form the image based on the image data, interrupts the image forming process, thereby to form the to-be-detected toner image 90. Specifically, the formation processing unit 51, inputs, into the optical scanning apparatus 25, to-be-detected image data in place of image formation-directed image data, thereby to form the to-be-detected toner image 90 on the middle transfer belt 26. Further, from the timing before the to-be-detected toner image 90 reaches a facing position where the middle transfer belt 26 and the secondary transfer roller 27 face each other, to the timing after the to-be-detected toner image 90 has passed through the facing position, the formation processing unit 51 causes the secondary transfer roller 27 to be spaced apart from the middle transfer belt 26, that is, causes the secondary transfer roller 27 to move to the spaced-apart position.

The formation processing unit 51, when the formation timing arrives during execution of the image formation process, may form the to-be-detected toner image 90 without interrupting the image formation process. Specifically, the formation processing unit 51 may form the to-be-detected toner image 90 on a region (inter-paper area) that is in the middle transfer belt 26 and that does not come into contact with the sheet supplied from the paper feeding unit 4.

The acquisition processing unit 52 acquires the density's variation width W1 (see FIG. 6) in the to-be-detected toner image 90 formed by the formation processing unit 51.

Specifically, the acquisition processing unit 52 acquires the variation width W1 based on a detection result of each of the density sensors 30.

Here, the to-be-detected toner image 90 includes a plurality of to-be-detected portions 91 (see FIG. 5) arranged along the right/left direction D3 as a longitudinal direction of the to-be-detected toner image 90. In other words, the to-be-detected toner image 90 preliminarily has a plurality of to-be-detected portions 91 arranged in the right/left direction D3. For example, the to-be-detected toner image 90 includes the to-be-detected portions 91 (91A, 91B, 91C, 91D, 91E, 91F, 91G, and 91H), eight in number, that are equidistantly spaced along the right/left direction D3. Further, FIG. 5 shows each of the to-be-detected portions 91 by a broken line.

As shown in FIG. 5, the plural density sensors 30 (30A, 30B, 30C, 30D, 30E, 30F, 30G, 30H) are placed corresponding to formation positions of the plural to-be-detected portions 91 on the middle transfer belt 26, and detect the densities of the plural to-be-detected portions 91. Specifically, the density sensor 30A is placed corresponding to the formation position of the to-be-detected portion 91A, and detects the density of the to-be-detected portion 91A. Further, the density sensor 30B is placed corresponding to the formation position of the to-be-detected portion 91B, and detects the density of the to-be-detected portion 91B. Further, the density sensor 30C is placed corresponding to the formation position of the to-be-detected portion 91C, and detects the density of the to-be-detected portion 91C. Further, the density sensor 30D is positioned corresponding to the formation position of the to-be-detected portion 91D, and detects the density of the to-be-detected portion 91D. Further, the density sensor 30E is positioned corresponding to the formation position of the to-be-detected portion 91E, and detects the density of the to-be-detected portion 91E. Further, the density sensor 30F is positioned corresponding to the formation position of the to-be-detected portion 91F, and detects the density of the to-be-detected portion 91F. Further, the density sensor 30G is positioned corresponding to the formation position of the to-be-detected portion 91G, and detects the density of the to-be-detected portion 91G. Further, the density sensor 30H is positioned corresponding to the formation position of the to-be-detected portion 91H, and detects the density of the to-be-detected portion 91H.

The acquisition processing unit 52 acquires, as the variation width W1, the difference between the highest value and the lowest value, for example, among the plural density values that correspond to the densities which are detected by the plural density sensors 30 and which are of the plural to-be-detected portions 91 (see FIG. 6).

That is, the acquisition processing unit 52 acquires the density's variation width W1 that is in the to-be-detected toner image 90 formed by the formation processing unit 51 and that is along the right/left direction D3.

In the storage unit 6, the acquisition processing unit 52 stores acquired data including, for example, information that shows the acquired variation width W1 and the date and time of acquiring the variation width W1.

As shown in FIG. 6, the density tends to more vary in the right end area of the to-be-detected toner image 90, compared with in the left end area. This is because a vibration caused to the drive force transmission unit 38 (see FIG. 4) provided on the right side of the photosensitive drum 31 affects the formation of the toner image. For example, when the right end side of the photosensitive drum 31 vibrates due to the vibration caused to the drive force transmission unit 38, the distance between the photosensitive drum 31 and the charging roller 32 varies. This causes a dispersion to the charge amount on the right end side of the photosensitive drum 31, and the above dispersion also causes a dispersion to the toner density of the to-be-detected toner image 90. When the right end side of the photosensitive drum 31 vibrates due to the vibration caused to the drive force transmission unit 38, the distance between the photosensitive drum 31 and the developing roller 44 varies. This causes a dispersion to the development amount on the right end side of the photosensitive drum 31, and the above dispersion also causes a dispersion to the toner density of the to-be-detected toner image 90.

The acquisition processing unit 52 may acquire, as the variation width W1, the density difference at the to-be-detected toner image 90's both end portions in the longitudinal direction of the to-be-detected toner image 90. That is, the acquisition processing unit 52 may acquire, as the variation width W1, the difference between a result of detection by the density sensor 30A and a result of detection by the density sensor 30H. In this case, the plurality of density sensors 30 may include only two, that is, the density sensor 30A and the density sensor 30H.

In place of the plurality of density sensors 30, a line sensor that is capable of capturing the toner image transferred to the middle transfer belt 26 and that is long in the right/left direction D3 may be provided. In this case, the acquisition processing unit 52 may use the line sensor thereby to acquire the variation width W1. Further, the plural density sensors 30 or the line sensor may be so provided as to face the sheet to which the to-be-detected toner image 90 is transferred by the secondary transfer roller 27. Further, the acquisition processing unit 52 may acquire the variation width W1 based on a read image that is read by the image reading unit 2 and that is of the sheet to which the to-be-detected toner image 90 is transferred.

The determination processing unit 53 determines the above failure timing of the gear 39 based on the variation width W1 for each of the above formation timings.

Specifically, the determination processing unit 53 determines the failure timing based on the variation width W1 for each of the above formation timings at and after the end timing when the decreasing trend of the variation width W1 ends.

The term "failure of the gear 39" herein refers to a state in which the function of the gear 39 has deteriorated to such an extent as to give an adverse effect, which is beyond a specific permissible limit, to the quality of the image formed by using photosensitive drum 31. In addition to the state in which the gear 39 is damaged, "failure of the gear 39" in this specification also includes a state in which wear of the gear 39 has progressed to such an extent as to cause the above adverse effect, and a state in which a lubricant applied to the gear 39 has decreased to such an extent as to cause the above adverse effect.

Specifically, in the image forming apparatus 100, the gear 39 is determined to have failed when the variation width W1 acquired by the acquisition processing unit 52 exceeds a specific threshold value TH1 (see FIG. 7).

FIG. 7 shows an example of the transition of the variation width W1 from a formation timing t1 to a formation timing t12 which are included in the plural consecutive the formation timings. Here, the formation timing t1 is the formation timing that first arrives after use of the image forming apparatus 100 was started. And, the formation timing t12 is the formation timing that first arrives after the failure of the gear 39, that is, after the gear 39 is determined to have failed.

As shown in FIG. 7, the variation width W1 gradually decreases from the start of use of the image forming apparatus 100. This is because a shape element, which is included in the gear 39 in a new-product state, such as a small burr that unnecessarily vibrates the gear 39, is worn away by the driving. In this specification, the period in which the wear of the shape element included in the gear 39 progresses and the variation width W1 gradually decreases is defined as an "initial wear period". In the example shown in FIG. 7, the initial wear period is from the formation timing t1 to a formation timing t4.

As shown in FIG. 7, the variation width W1 gradually increases from the end of the initial wear period. This is because the wear of the gear 39 gradually progresses, and the function of the gear 39 gradually decreases. In this specification, the period in which the variation width W1 gradually increases from the end of the initial wear period until the period in which the variation width W1 is determined to exceed the threshold value TH1 is defined as a "normal wear period". In the example shown in FIG. 7, the normal wear period is from the formation timing t4 to the formation timing t12.

As shown in FIG. 7, the variation width W1 in the normal wear period increases in a slightly curvilinear manner. Thus, it is possible to linearly approximate the transition of the variation width W1 at the beginning of the normal wear period, and to infer the failure timing based on an approximation result. It is also possible to curvilinearly approximate the transition of the variation width W1 until the middle or end of the normal wear period, and to infer the failure timing based on the approximation result.

For example, when the acquired data is stored in the storage unit 6 by the acquisition processing unit 52, the determination processing unit 53, based on the acquired data stored in storage unit 6, determines whether or not the end timing has already has arrived, that is, whether or not the initial wear period has ended.

Here, when determining that the end timing has arrived, the determination processing unit 53 determines the failure timing based on the acquired data acquired at and after the end timing. For example, when the number of acquired data acquired at and after the end timing is less than the specific standard number, the determination processing unit 53 makes a linear approximation of the transition of the variation width W1 in the normal wear period, and determines the failure timing based on the approximation result. When the number of acquired data acquired at and after the end timing is greater than or equal to the standard number, the determination processing unit 53 curvilinearly approximates the transition of the variation width W1 in the wear period, and determines the failure timing based on the approximation result.

Meanwhile, when determining that the end timing has not yet arrived, the determination processing unit 53 does not determine the failure timing.

The determination processing unit 53 may determine the failure timing based on the variation width W1 for each of the formation timings at and before the end timing. For example, the determination processing unit 53 may determine the failure timing by using an artificial intelligence that has learned the relation between the variation width W1 acquired in the initial wear period and the transition of the variation width W1 until the failure of the gear 39. In this case, the learning of the relation by the artificial intelligence can be realized by using, as teacher data, data that are acquired through an experiment using a plurality of image forming apparatuses 100 and that show the transition of the variation width W1 from the start of use of each of the image forming apparatuses 100 to the failure of the gear 39.

The notification processing unit 54 notifies the failure timing determined by the determination processing unit 53.

For example, the notification processing unit 54 causes the operation display unit 5 to display a message which includes the failure timing determined by the determination processing unit 53. For example, the failure timing is shown by the number of sheets that can be printed before the failure timing arrives, or by the operation time of the image forming unit 3.

Failure Timing Determination Process

Figure 8:
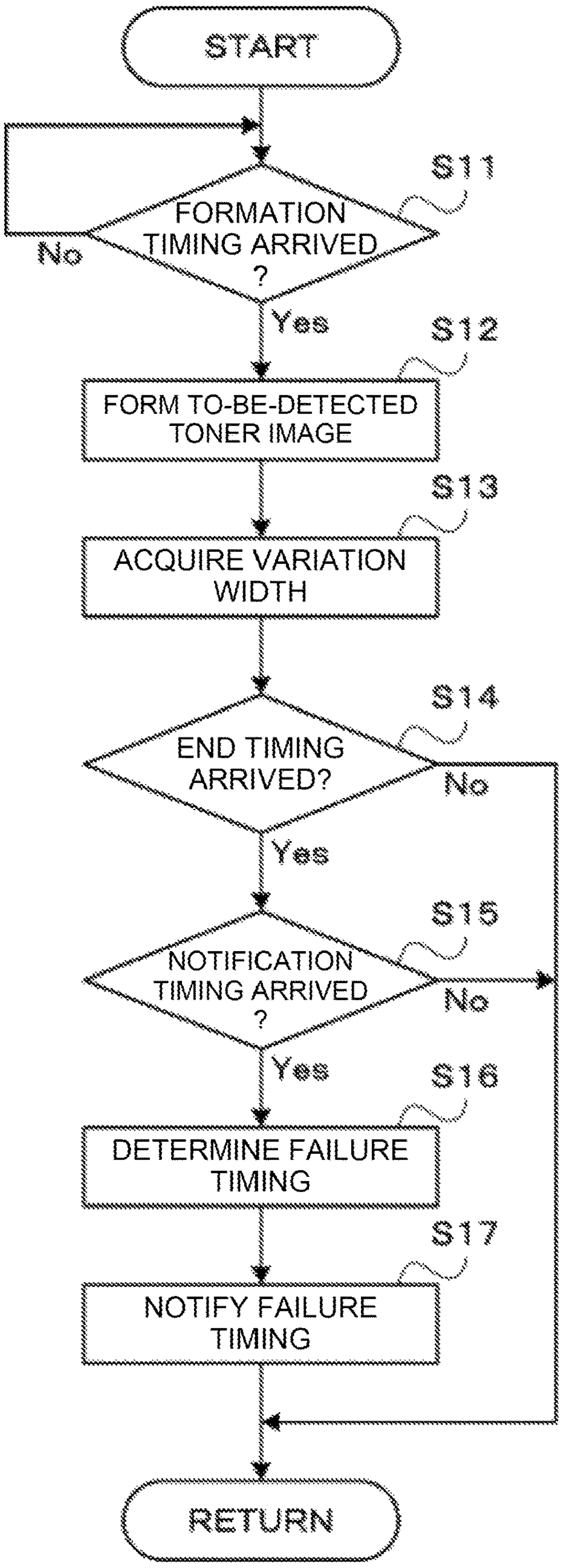
FIG. 8 is a flowchart showing an example of a failure timing determination process executed by the image forming apparatus according to the embodiment of this disclosure.

Hereinafter, with reference to FIG. 8, a determining method of this disclosure will be described along with an example of a procedure of the failure timing determination process executed by the control unit 7 in the image forming apparatus 100. Here, steps S11, S12 . . . represent numbers of processing procedures (steps) to be executed by the control unit 7. The fault timing determination process is executed together with the image forming process when the image forming process is executed.

<Step S11>

First, in step S11, the control unit 7 determines whether or not the above formation timing has arrived.

Specifically, the control unit 7, when the cumulative total of the number of printed sheets reaches a multiple of the standard number of sheets during the execution of the image formation process, determines that the formation timing has arrived.

Here, when determining that the above formation timing has arrived (Yes side of S11), the control unit 7 moves the process to step S12. If the above formation timing has not arrived (No side of S11), the control unit 7 in step S11 waits for the formation timing to arrive.

<Step S12>

In step S12, the control unit 7 interrupts the image formation process, thereby to form the to-be-detected toner image 90. Here, the processes in steps S11 and S12 are each an example of the forming step of this disclosure, and are executed by the formation processing unit 51 of the control unit 7.

Specifically, the control unit 7 inputs, to the optical scanning apparatus 25, the to-be-detected image data in place of the image formation-directed image data, thereby to form the to-be-detected toner image 90 on the middle transfer belt 26. Also, the control unit 7 moves the secondary transfer roller 27 to the spaced-apart position from the timing before the to-be-detected toner image 90 reaches the facing position, where the middle transfer belt 26 and the secondary transfer roller 27 face each other, to the timing after the to-be-detected toner image 90 has passed through the opposite position. Further, the control unit 7, after the to-be-detected toner image 90 has passed through the facing position, moves the secondary transfer roller 27 to the contact position, and restarts the image forming process.

<Step S13>

In step S13, the control unit 7 acquires the density's variation width W1 in the to-be-detected toner image 90 formed in step S12. Here, the process of step S13 is an example of the acquisition step of this disclosure, and is executed by the acquisition processing unit 52 of the control unit 7.

Specifically, the control unit 7 acquires, as the variation width W1, the difference between the highest value and the lowest value, among the plurality of density values that correspond to the densities which are detected by the plurality of density sensors 30, and which are of the plural to-be-detected portions 91 included in the to-be-detected toner image 90. Then, in the storage unit 6, the control unit 7 stores the acquired data including information that shows the acquired variation width W1 and the date and time of acquiring the variation width W1.

Here, the to-be-detected toner image 90 is formed based on the to-be-detected image which is a halftone image. This makes it possible to make the acquired variation width W1 larger, compared to the configuration in which the to-be-detected toner image 90 is formed based on the image with a black density value of 100 percent, that is, the to-be-detected image which is black.

<Step S14>

In step S14, the control unit 7 determines whether or not the end timing has already arrived.

Specifically, based on the acquired data stored in the storage unit 6, the control unit 7 determines whether or not the end timing has already arrived.

When determining that the end timing has already arrived (Yes side of S14), the control unit 7 moves the process to step S15. When determining that the end timing has not yet arrived (No side of S14), the control unit 7 moves the process to step S11.

When determining that the end timing has already arrived (Yes side of S14), the control unit 7 may move the process to step S16. That is, the process of step S15 may be omitted.

<Step S15>

In step S15, the control unit 7 determines whether the specific notification timing has arrived.

The notification timing includes the timing when the number of acquired data acquired at and after the end timing becomes two, for example. And, the notification timing includes the timing when the number of acquired data acquired at and after the end timing becomes the same as the standard number.

Here, when determining that the notification timing has arrived (Yes side of S15), the control unit 7 moves the process to step S16. If the above notification timing has not arrived (No side of S15), the control unit 7 moves the process to step S11.

<Step S16>

In step S16, the control unit 7 determines the failure timing of the gear 39. Here, the process of step S16 is an example of the determination step of this disclosure, and is executed by the determination processing unit 53 of the control unit 7.

Specifically, when the number of acquired data acquired at and after the end timing is two, the control unit 7 makes a linear approximation of the transition of the variation width W1 in the normal wear period, and determines the failure timing based on the approximation result. This make it possible to early determine the failure timing.

When the number of acquired data acquired at and after the end timing is the same as the standard number, the control unit 7 curvilinearly approximates the transition of the variation width W1 in the normal wear period, and determines the failure timing based on the approximation result. This makes it possible to determine the failure timing with an accuracy higher than in the case of the linear approximation of the transition of the variation width W1 in the normal wear period.

<Step S17>

In step S17, the control unit 7 makes a notification of the fault timing determined in step S16. Here, the process of step S17 is executed by the notification processing unit 54 of the control unit 7.

Specifically, the control unit 7 causes the operation display unit 5 to display the message including the failure timing determined in step S16. This allows the user to prepare for maintenance before the notified failure timing. For example, the user can have prepared the gear 39 for replacement and can have prepared the lubricant to be applied to the gear 39. And, the user can have made an appointment for maintenance service by a service personnel of the manufacturer of the image forming apparatus 100.

Figure 9:
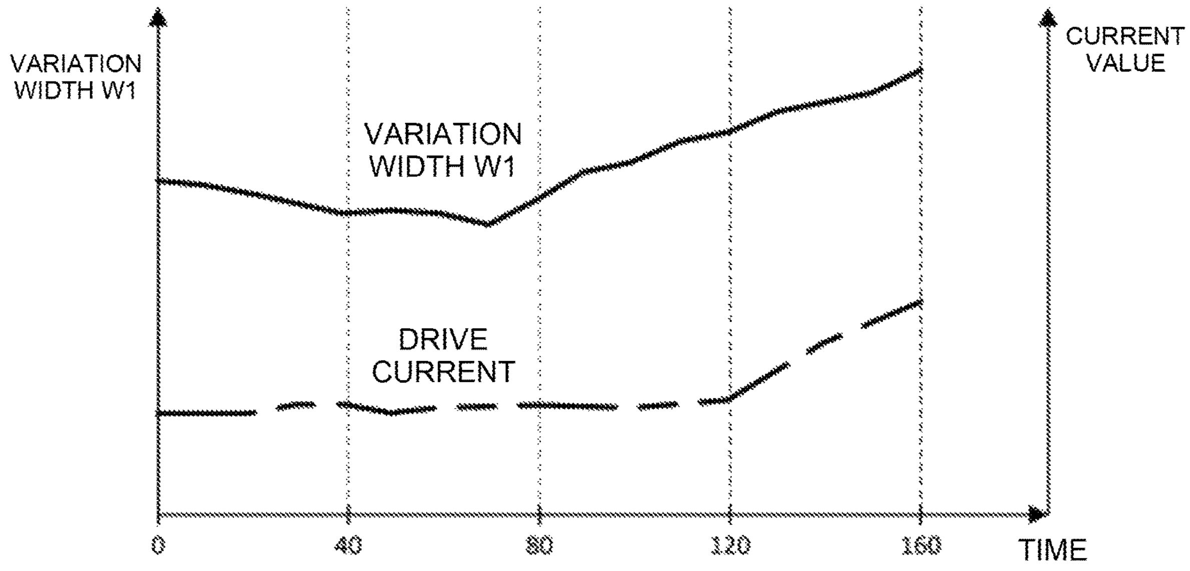
FIG. 9 shows an example of the transition of the density's variation width which is acquired by the image forming apparatus according to the embodiment of this disclosure and which is of the to-be-detected toner image, as well as an example of a transition of a drive current.

Here, FIG. 9 shows an example of the transitions of the variation width W1 and the drive current which are seen in the case where the new image forming apparatus 100 is continuously operated until the failure of the gear 39. In the example shown in FIG. 9, the gear 39 fails at the timing when the continuous use time of the image forming apparatus 100 has reached 160 hours. In FIG. 9, the transition of the variation width W1 is shown by a thick solid line, and the transition of the drive current is shown by a thick single-point chain line, respectively.

As shown in FIG. 9, the drive current gradually increases from around the timing when the continuous use time of the image forming apparatus 100 reaches 120 hours until the failure timing of the gear 39. This is because the load increase due to aging deterioration of the gear 39 is reflected on the drive current.

Meanwhile, as shown in FIG. 9, the variation width W1 gradually increases from around the timing when the continuous use time of the image forming apparatus 100 reaches 70 hours until the failure timing of the gear 39. That is, the increase in the variation width W1 starts earlier than the increase in the drive current. Thus, the image forming apparatus 100 can determine the failure timing of the gear 39 earlier than the configuration of determining the failure timing based on the drive current.

Thus, in the image forming apparatus 100, at each arrival of the formation timing, the to-be-detected toner image 90 is formed using the photosensitive drum 31, and the density's variation width W1 in the formed to-be-detected toner image 90 is acquired. And, the failure timing of the gear 39 is determined based on the variation width W1 for each formation timing. This makes it possible to determine the failure timing of the gear 39 earlier compared to the configuration of determining the failure timing based on the drive current.

What is claimed is:

1. An image forming apparatus which includes an image forming unit that forms a toner image, comprising:

a gear that transmits a drive force, which is supplied from a drive unit, to a rotary member used for forming the toner image;

a formation processing unit that, at arrival of each of specific formation timings, uses the rotary member thereby to form a to-be-detected toner image that is based on a to-be-detected image having a specific density;

an acquisition processing unit that acquires a variation width of a density in the to-be-detected toner image formed by the formation processing unit; and a determination processing unit that determines a failure timing of the gear based on the variation width for each of the formation timings.

2. The image forming apparatus according to claim 1, wherein the determination processing unit determines the failure timing based on the variation width for each of the formation timings at and after an end timing when a decreasing trend of the variation width ends.

3. The image forming apparatus according to claim 1, wherein the to-be-detected toner image is long in an extension direction of a rotary axis of the rotary member, the image forming apparatus includes plural density sensors that detect densities of plural to-be-detected portions arranged in the to-be-detected toner image along a longitudinal direction of the to-be-detected toner image, and the acquisition processing unit acquires the variation width based on a detection result of each of the density sensors.

4. The image forming apparatus according to claim 1, wherein the to-be-detected image includes a halftone image.

5. The image forming apparatus according to claim 1, wherein the rotary member includes an image carrier on which an electrostatic latent image is formed.

6. A determining method executed in an image forming apparatus including an image forming unit that forms a toner image and being equipped with a gear that transmits a drive force, which is supplied from a drive unit, to a rotary member used for forming the toner image by the image forming unit, the determining method comprising:

forming, at arrival of each of specific formation timings, uses the rotary member thereby to form a to-be-detected toner image that is based on a to-be-detected image having a specific density;

acquiring a variation width of a density in the to-be-detected toner image formed by the forming; and determining a failure timing of the gear based on the variation width for each of the formation timings.

* * * * *